(12) United States Patent
Naya et al.

(10) Patent No.: US 11,149,409 B2
(45) Date of Patent: Oct. 19, 2021

(54) CONSTRUCTION MACHINE (71) Applicant: Hitachi Construction Machinery Co., Ltd., Tokyo (JP)

(72) Inventors: Itaru Naya, Tsuchiura (JP); Shinya Imura, Toride (JP); Masafumi Hita, Kasumigaura (JP); Seiji Ishida, Hitachinaka (JP); Ken Takeuchi, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 616 days.

(21) Appl. No.: 16/081,734

(22) PCT Filed: Mar. 14, 2017

(86) PCT No.: PCT/JP2017/010086
§ 371 (c)(1),
(2) Date: Aug. 31, 2018

(87) PCT Pub. No.: WO2017/199561
PCT Pub. Date: Nov. 23, 2017

(65) Prior Publication Data
US 2021/0214920 A1 Jul. 15, 2021

(30) Foreign Application Priority Data

May 18, 2016 (JP) .............................. JP2016-099528

(51) Int. Cl.
*E02F 9/22* (2006.01)
*E02F 9/20* (2006.01)
(Continued)

(52) U.S. Cl.
CPC .......... *E02F 9/2217* (2013.01); *E02F 9/2075* (2013.01); *E02F 9/2091* (2013.01);
(Continued)

(58) Field of Classification Search
None
See application file for complete search history.

(56) References Cited

U.S. PATENT DOCUMENTS 9,487,932 B2 * 11/2016 Ishihara .................. B60L 58/15
9,540,790 B2 * 1/2017 Ishihara ................ E02F 9/2075
(Continued)

FOREIGN PATENT DOCUMENTS

ER  3 064 652 A1  9/2016
ER  3 208 387 A1  8/2017
(Continued)

OTHER PUBLICATIONS

Extended European Search Report issued in European Application No. 17798996.9 dated Jan. 31, 2020 ( eight (8) pages).
(Continued)

*Primary Examiner* — Michael Leslie
(74) *Attorney, Agent, or Firm* — Crowell & Moring LLP (57) ABSTRACT

A main controller and a hybrid controller control an engine, an assist generator motor, a hydraulic pump and an electricity storage device. In this case, the hybrid controller is provided with a performance state recovery part that performs performance state recovery of the electricity storage device. In a case where a performance state amount varying with repetition of a discharge and a charge of the electricity storage device, specifically, a current integrated value ratio of the electricity storage device goes beyond a predetermined threshold value (L1%), the performance state recovery part limits power of the hydraulic pump. Thereby, the performance state recovery part performs the performance state recovery of the electricity storage device.

3 Claims, 6 Drawing Sheets

(51) Int. Cl.
  *F15B 21/08* (2006.01)
  *F15B 21/14* (2006.01)
  *F15B 15/18* (2006.01)

(52) U.S. Cl.
  CPC ......... *E02F 9/2235* (2013.01); *E02F 9/2246* (2013.01); *E02F 9/2271* (2013.01); *F15B 21/08* (2013.01); *F15B 21/14* (2013.01); *E02F 9/207* (2013.01); *E02F 9/2296* (2013.01); *F15B 15/18* (2013.01)

(56) References Cited

U.S. PATENT DOCUMENTS

| | | | |
|---|---|---|---|
| 9,550,413 B2* | 1/2017 | Take | B60K 6/485 |
| 9,745,723 B2* | 8/2017 | Inoue | H02J 7/0047 |
| 9,863,124 B2* | 1/2018 | Ishihara | B60W 20/13 |
| 2009/0140697 A1 | 6/2009 | Hurley et al. | |
| 2009/0222158 A1 | 9/2009 | Kubota et al. | |
| 2010/0186404 A1 | 7/2010 | Yasufuku et al. | |
| 2011/0082610 A1 | 4/2011 | Kawasaki et al. | |
| 2011/0251746 A1* | 10/2011 | Wu | E02F 9/2075 701/22 |
| 2016/0083932 A1 | 3/2016 | Inoue et al. | |

FOREIGN PATENT DOCUMENTS

| | | |
|---|---|---|
| JP | 10-210675 A | 8/1998 |
| JP | 2005-83242 A | 3/2005 |
| JP | 2006-149181 A | 6/2006 |
| JP | 2008-280178 A | 11/2008 |
| JP | 2009-208512 A | 9/2009 |
| JP | 2013-2540 A | 1/2013 |
| JP | 2014-150623 A | 8/2014 |
| KR | 10-2014-0090136 A | 7/2014 |
| WO | 2009-236190 A | 10/2009 |
| WO | 2014-197972 A | 10/2014 |
| WO | WO 2016/060132 A1 | 4/2016 |
| WO | WO 2016/084421 A1 | 6/2016 |

OTHER PUBLICATIONS

International Search Report (PCT/ISA/210 &PCT/ISA/220) issued in PCT Application No. PCT/JP2017/010086 dated Apr. 11, 2017 (five (5) pages).

Japanese-language Written Opinion (PCT/ISA/237) issued in PCT Application No. PCT/JP2017/010086 dated Apr. 11, 2017 (six (6) pages).

Korean-language Office Action issued in counterpart Korean Application No. 10-2018-7024898 dated Sep. 19, 2019 with English translation (nine (9) pages).

\* cited by examiner

CONSTRUCTION MACHINE

TECHNICAL FIELD

The present invention relates to construction machines of hydraulic excavators, wheel loaders or the like.

BACKGROUND ART

In recent years, energy saving has been advanced even in construction machines of hydraulic excavators, wheel loaders or the like in consideration of depletion of resources or environmental problems. That is, the construction machine drives a hydraulic pump by power of an engine and drives hydraulic actuators (hydraulic devices and hydraulic equipment devices) by hydraulic oil delivered by the hydraulic pump.

On the other hand, in recent years, hybrid type construction machines, which replace a part of the power for driving the hydraulic pump with power of an electric motor having an electricity storage device as a supply source of energy, have been on the market. Further, electric construction machines as well, which replace all the power for driving the hydraulic pump with the power of the electric motor, have been on the market.

However, the electricity storage device is required to be operated within a range of a defined use state in terms of securement of safety and suppression of performance degradation. Therefore, the construction machine with the electricity storage device requires new limits and operations.

For example, in a lithium ion secondary battery configuring the electricity storage device, the use state of voltages, current, temperatures, a state of charge (SOC) and the like is defined for the purpose of securement of safety and suppression of performance degradation. Therefore, the construction machine with the electricity storage device needs to be operated not to deviate from the use state of the electricity storage device.

Here, it is known that the electricity storage device, aside from irreversible performance degradation such as damage of a battery, for example does not lead to the irreversible performance degradation, but causes reversible performance degradation (temporal performance degradation) of being temporarily incapable of effecting a given performance.

Specifically, in a case where the electricity storage device charges/discharges a large current, a battery internal resistance thereof temporarily increases and therefore a battery voltage possibly varies rapidly. It is known that in the electricity storage device, temporal performance degradation occurs because of such rapid variation of the battery voltage. At this time, estimation and control of a battery state cannot be performed correctly, possibly resulting in being incapable of sufficiently effecting the performance of electric equipment devices such as an inverter and an electric motor.

On the other hand, Patent Document 1 describes technologies about electric vehicles. The electric vehicle controls current to be discharged to an inverter from an electricity storage device in accordance with a current square integrated value found by integrating square values of discharge current of an electricity storage device (lithium ion secondary battery). On the other hand, Patent Document 2 describes technologies about working machines. The working machine controls return oil from a hydraulic actuator based upon a state of charge (SOC) of the electricity storage device and controls regenerative power of an electric generator driven with power of a pump driven by the return oil.

PRIOR ART DOCUMENT

Patent Document

Patent Document 1: Japanese Patent Laid-Open No. 2006-149181 A

Patent Document 2: Japanese Patent Laid-Open No. 2013-2540 A

SUMMARY OF THE INVENTION

Incidentally, as described in Patent Document 1, in a case of controlling output (discharge) of the electricity storage device in accordance with a state (current square integrated value) of the electricity storage device, the following inconvenience possibly occurs. That is, when the output of the electricity storage device is limited to suppress temporal performance degradation (for example, rapid variation in voltage) of the electricity storage device, there is a possibility that the output corresponding to the limited amount cannot be compensated with an increase in output of an engine. In addition, at the time of limiting the output of the electricity storage device, for example, there is also a possibility of a failure (for example, a delay) in estimation of an influence on power of a hydraulic pump or control of the hydraulic pump based upon this estimation. In such a case, operability of the hydraulic actuator deteriorates, such as rapid variation of a hydraulic actuator movement, possibly giving strange feelings to an operator.

The present invention is made in view of the above-mentioned problems in the conventional art, and an object of the present invention is to provide a construction machine that can achieve both suppression of temporal performance degradation of an electricity storage device and an improvement on operation feelings at the use limiting of the electricity storage device.

A construction machine according to the present invention comprises, an electric motor; a hydraulic pump to be driven by said electric motor; a hydraulic actuator to be driven by hydraulic oil delivered from the hydraulic pump; an electricity storage device that supplies power to the electric motor or is charged with generated power by the electric motor; and a controller configured to control at least one of the electric motor, the hydraulic pump and the electricity storage device.

For solving the above-mentioned problems, the configuration adopted by the present invention is characterized in that the controller, in a case where a performance state amount that varies with repetition of the discharge and charge of the electricity storage device goes beyond a predetermined threshold value, includes a performance state recovery part configured to perform performance state recovery of the electricity storage device (16) by limiting power of the hydraulic pump.

According to the present invention, it is possible to achieve both suppression of temporal performance degradation of an electricity storage device and an improvement on operation feelings at the use limiting of the electricity storage device.

MODE FOR CARRYING OUT THE INVENTION

Hereinafter, construction machines according to embodiments in the present invention will be in detail explained with reference to the accompanying drawings, with an example of application of each to a hybrid type hydraulic excavator.

Figure 1:
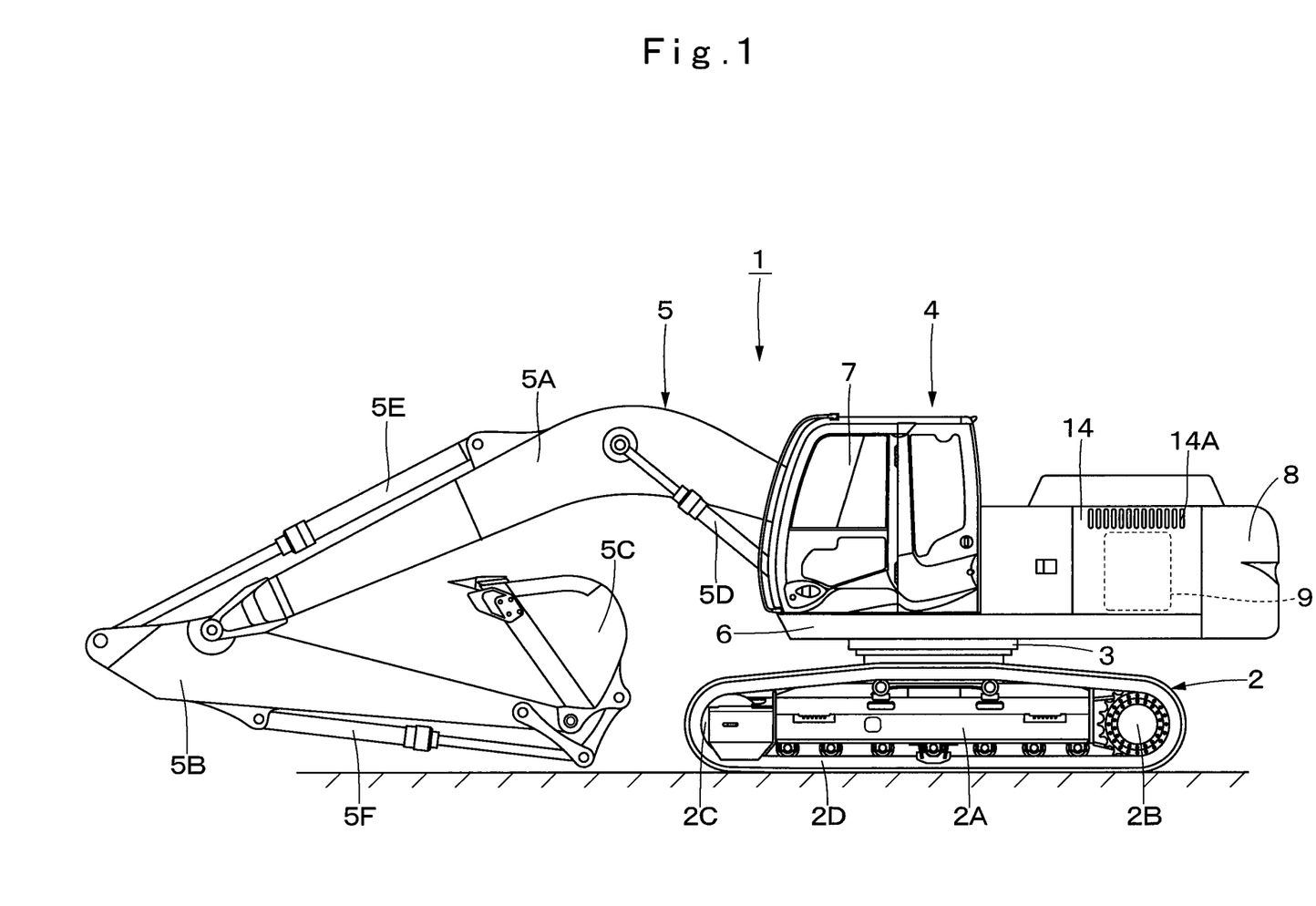
FIG. 1 is a front view showing a hybrid type hydraulic excavator according to an embodiment.

In FIG. 1, a hydraulic excavator 1 as a representative example of construction machines is configured as a hybrid type hydraulic excavator (hybrid type construction machine). The hydraulic excavator 1 includes an automotive lower traveling structure 2 of a crawler type, a revolving bearing device 3 that is provided on the lower traveling structure 2, an upper revolving structure 4 that is mounted to be capable of revolving on the lower traveling structure 2 through the revolving bearing device 3, and a working mechanism 5 that is provided in the front side of the upper revolving structure 4 to be capable of lifting and tilting thereto. At this time, the lower traveling structure 2 and the upper revolving structure 4 configure a vehicle body of the hydraulic excavator 1. The hydraulic excavator 1 can perform an excavating work of earth and sand, and the like by using the working mechanism 5.

Here, the lower traveling structure 2 includes a truck frame 2A, drive wheels 2B provided on both of left and right sides of the truck frame 2A, idler wheels 2C provided on both of the left and right sides of the truck frame 2A and at the opposite side in the front-rear direction to the drive wheels 2B, and crawler belts 2D wound around and between the drive wheels 2B and the idler wheels 2C (only the left one in any component is shown). The left and right drive wheels 2B are respectively driven and rotated by left and right traveling hydraulic motors 2E, 2F (refer to FIG. 2) as hydraulic actuators, causing the hydraulic excavator 1 to travel by driving the crawler belts 2D The working mechanism 5 includes a boom 5A mounted on a front part side of a revolving frame 6 to be capable of lifting and tiling thereto, an arm 5B mounted on a tip end side of the boom 5A to be rotatable, a bucket 5C as a working tool mounted on a tip end side of the arm 5B to be rotatable, and a boom cylinder 5D, an arm cylinder 5E and a bucket cylinder 5F as working tool cylinders, which drive them. The boom cylinder 5D, the arm cylinder 5E and the bucket cylinder 5F composed of hydraulic cylinders, further, traveling hydraulic motors 2E, 2F and revolving hydraulic motor 15A to be described later (refer to FIG. 2) are respectively operable as hydraulic actuators to be driven by hydraulic oil.

On the other hand, the upper revolving structure 4 includes the revolving frame 6 formed as a base (frame) forming a support structural body of the upper revolving structure 4, a cab 7, a counterweight 8, an engine 9, a hydraulic pump 10, an assist generator motor 13, an electricity storage device 16, an inverter 19, and the like, which are mounted on the revolving frame 6.

The cab 7 to define an operator's room is provided in a left front side of the revolving frame 6. An operator's seat on which an operator sits is provided in the cab 7. A traveling operating lever/pedal device, a working operating lever device (none of them is shown) and the like are provided on the periphery of the operator's seat. The operating lever/pedal device and the operating lever device output pilot signals (pilot pressures) in response to operations of the operating lever and the operating pedal by an operator to a control valve 12 to be described later.

Further, a hybrid controller 22 and a main controller 24, which will be described later, are provided in the cab 7 to be positioned in a rear lower side of the operator's seat. On the other hand, the counterweight 8 is provided in a rear end side of the revolving frame 6 to act as a weight balance to the working mechanism 5.

Figure 2:
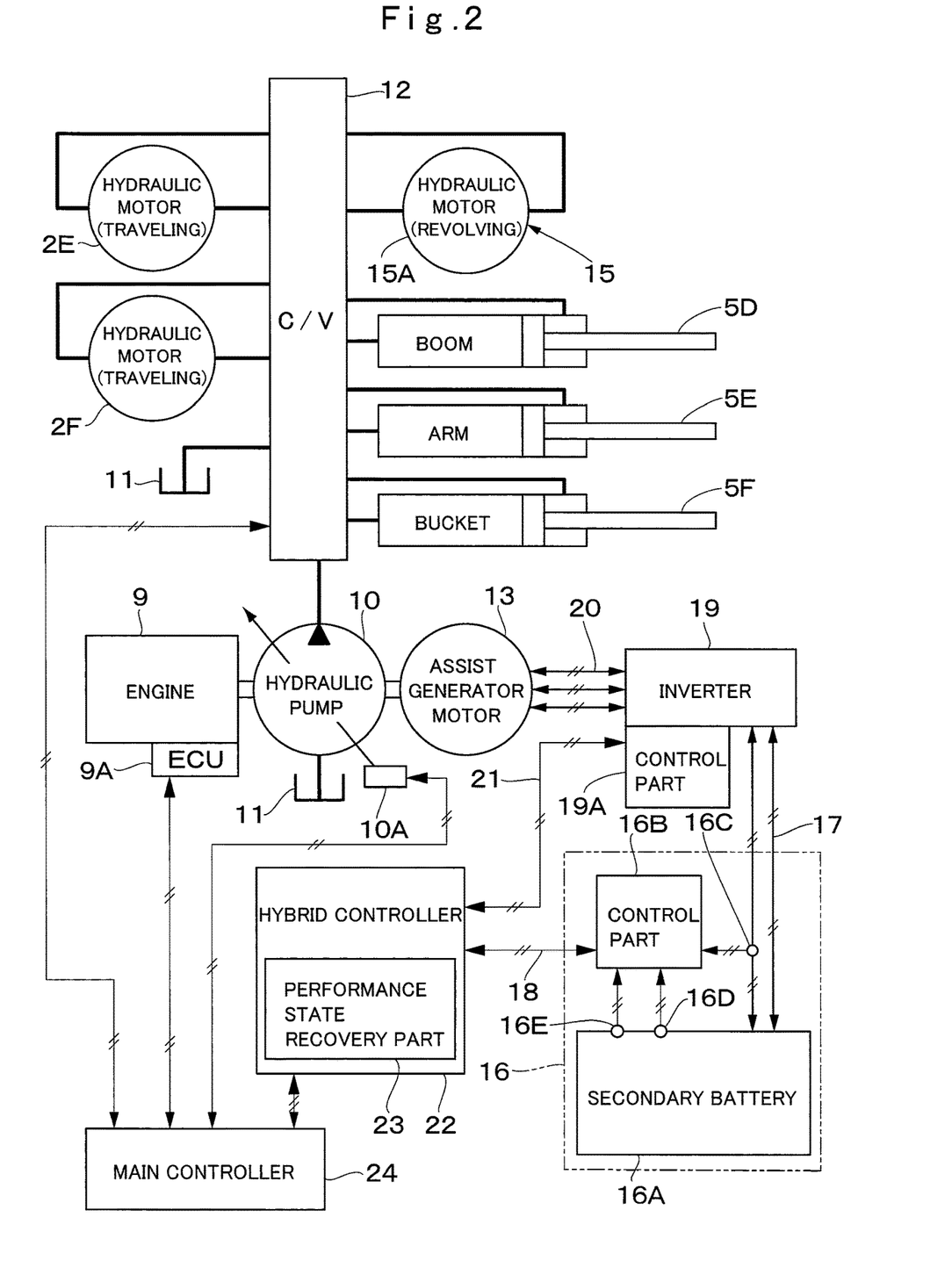
FIG. 2 is a block diagram schematically showing a hydraulic system and an electric system in the hydraulic excavator.

The engine 9 is positioned in front side of the counterweight 8 and is disposed in a rear side of the revolving frame 6. The engine 9 is an internal combustion engine and is mounted on the revolving frame 6 in a horizontal state where an axis line of a crank shaft (not shown) extends in the left-right direction. As shown in FIG. 2, the hydraulic pump 10 and the assist generator motor 13 are mounted on one side (for example, a right side) of the engine 9 in the left-right direction.

Here, the engine 9 is formed of, for example, an electronically controlled engine and is controlled by an ECU 9A as an engine control unit. Specifically, a supply amount of fuel into cylinders (combustion chambers) of the engine 9, that is, an injection amount of a fuel injection device (electronically controlled injection valve) that injects fuel into cylinders is variably controlled by the ECU 9A. In this case, the ECU 9A is connected to the main controller 24 to be described later. The ECU 9A variably controls a fuel injection amount to be injected into cylinders by the fuel injection device based upon a control signal (command signal) outputted from the main controller 24 to control a rotational speed of the engine 9.

The hydraulic pump 10 is mounted to an output side of the engine 9. When the hydraulic pump 10 is driven by the engine 9 and the assist generator motor 13, the hydraulic pump 10 delivers working hydraulic oil toward various kinds of hydraulic actuators of the left and right traveling hydraulic motors 2E, 2F, the respective cylinders 5D, 5E, 5F, the revolving hydraulic motor 15A and the like (hereinafter, referred to as hydraulic actuators 2E to 15A), which are mounted on the hydraulic excavator 1.

The hydraulic pump 10 is a variable displacement hydraulic pump formed of a swash plate type variable displacement hydraulic pump, and the like for example. The hydraulic pump 10 has a regulator (a variable displacement part or tilting actuator) 10A that regulates a delivery amount (pump displacement). The regulator 10A is variably controlled by the main controller 24 to be described later.

A hydraulic oil tank 11 is provided in the vicinity (for example, in a front side of the vehicle body in the front-rear direction) of the hydraulic pump 10. The hydraulic oil tank 11 reserves hydraulic oil to be supplied to the hydraulic actuators 2E to 15A.

The control valve 12 is a control valve device formed of a collector of a plurality of directional control valves, a plurality of solenoid control valves and the like. The control valve 12 controls a direction of the hydraulic oil to be delivered to the various kinds of the hydraulic actuators 2E to 15A from the hydraulic pump 10 in response to a lever operating amount or a pedal operating amount of the traveling operating lever/pedal device and the working operating lever device arranged in the cab 7 (hereinafter, referred to as lever operating amount of the operating device), a command from the main controller 24, and the like. Thereby, the hydraulic actuators 2E to 15A are driven by the hydraulic oil to be delivered from the hydraulic pump 10.

The assist generator motor 13 as an electric motor is mounted to an output side of the engine 9 together with the hydraulic pump 10. The assist generator motor 13 is connected mechanically to the engine 9.

The assist generator motor 13 is driven by the engine 9 to generate power or assists in a drive of the engine 9 by supply of power from the electricity storage device 16. That is, the assist generator motor 13 has a function as an electric generator that is driven by the engine 9 to generate power and a function as an electric motor that assists in a drive of the engine 9 by supply of power from the electricity storage device 16.

A housing cover 14 is provided on the revolving frame 6 to be positioned in front side of the counterweight 8. The housing cover 14 is to cover the engine 9, the hydraulic pump 10, the assist generator motor 13 and the like. The housing cover 14 is provided with an air inlet port 14A that sucks in outside air as cooling air.

A revolving device 15 is provided in a central part of the revolving frame 6. The revolving device 15 revolves the upper revolving structure 4 to the lower traveling structure 2. The revolving device 15 includes, for example, the revolving hydraulic motor 15A as a hydraulic actuator, a reduction mechanism (not shown) that reduces rotation of the revolving hydraulic motor 15A, and an output shaft (not shown) as a pinion that outputs the rotation reduced in speed by the reduction mechanism to the revolving bearing device 3 (internal tooth of an inner race thereof). The revolving hydraulic motor 15A drives/revolves the upper revolving structure 4 to the lower traveling structure 2 based upon the hydraulic oil delivered through the control valve 12 from the hydraulic pump 10.

The electricity storage device 16 performs a charge and a discharge of power. The electricity storage device 16 is configured using, for example, a lithium ion secondary battery 16A and is mounted on the revolving frame 6. The electricity storage device 16 charges the generated power generated by the assist generator motor 13 or discharges (supplies) the charged power to the assist generator motor 13. Therefore, the electricity storage device 16 is connected to an inverter 19 through a DC bus 17 as a DC cable.

Here, the electricity storage device 16 includes the lithium ion secondary battery 16A with battery modules being arranged in series and in parallel and a control part (battery controller) 16B configured to determine and control a state of the lithium ion secondary battery 16A. The electricity storage device 16 is provided with a current sensor 16C that detects (measures) a discharge/charge current of the lithium ion secondary battery 16A, a voltage sensor 16D that detects a voltage of the lithium ion secondary battery 16A and a temperature sensor 16E that detects a temperature of the electricity storage device 16 itself, that is, a temperature of the lithium ion secondary battery 16A.

Each of the sensors 16C, 16D, 16E is connected to the control part 16B. The control part 16B performs necessary calculations based upon a current, a voltage and a temperature detected by the sensors 16C, 16D, 16E respectively, and determines and controls a state of the lithium ion secondary battery 16A. Further, the control part 16B is connected to the hybrid controller 22 to be described later through an electricity storage device signal line 18.

It should be noted that the electricity storage device 16 may be formed using, for example, an electric double layer capacitor other than the lithium ion secondary battery 16A. In a case of using the capacitor in the electricity storage device 16, a chopper is provided between the electricity storage device 16 and the inverter 19, and the chopper can hold a voltage of a DC bus 17 for connection between the electricity storage device 16 and the inverter 19 to be constant.

The inverter 19 controls an operation of the assist generator motor 13. The inverter 19 is connected to the assist generator motor 13 through a motor power line 20 as a three-phase AC cable (strong electricity cable). A plurality of switching elements composed of a transistor, an insulating gate bipolar transistor (IGBT) and the like are accommodated in the inverter 19. An ON (opening)/OFF (closing) operation of each of the switching elements is controlled by a control part 19A. The control part 19A is connected to the hybrid controller 22 through a motor signal line 21.

The control part 19A performs switching control of the inverter 19 based upon a command of the hybrid controller 22. It should be noted that although the drawing is omitted, a signal line extending from the assist generator motor 13 is also connected to the inverter 19. This signal line outputs a detection signal (for example, an assist motor speed signal) from a sensor of a rotational detection sensor (resolver) provided in the assist generator motor 13, for example or the like to the control part 19A of the inverter 19.

At the power generation of the assist generator motor 13, the inverter 19 converts power generated by the assist generator motor 13 into DC power and is stored in the electricity storage device 16 through the DC bus 17. On the other hand, at the time of driving the assist generator motor 13 as an electric motor, the inverter 19 converts the DC power discharged from the electricity storage device 16 through the DC bus 17 into a three-phase AC power and the three-phase AC power is supplied to the assist generator motor 13 through the motor power line 20.

The hybrid controller 22 as a controller controls the assist generator motor 13 and the electricity storage device 16. The hybrid controller 22 includes a microcomputer as similar to the control part 16B of the electricity storage device 16, the control part 19A of the inverter 19, the ECU 9A of the engine 9 and the main controller 24 to be described later. The hybrid controller 22 is connected electrically to each of the control parts 16B, 19A and the main controller 24, to form a CAN.

The hybrid controller 22 is a controller positioned upstream of each of the control parts 16B, 19A, and integrally controls each of these control parts 16B, 19A. Specifically, the hybrid controller 22 outputs a control signal to the control part 19A of the inverter 19 to control the operation of the assist generator motor 13, thus controlling a charge or discharge by the electricity storage device 16. On the other hand, the main controller 24 also includes a microcomputer as similar to the hybrid controller 22. The main controller 24 is connected electrically to the ECU 9A, the hybrid controller 22, the regulator 10A of the hydraulic pump 10 and a solenoid control valve (not shown) forming the control valve 12 respectively.

The main controller 24 establishes communication with the ECU 9A and the hybrid controller 22 and transmits various kinds of control signals to the ECU 9A and the hybrid controller 22 based upon, for example, a lever operating amount of the operating device, a rotational speed of the engine 9, a state of charge (SOC) of the electricity storage device 16 and the like. Thereby, the ECU 9A controls the rotational speed of the engine 9 and the like based upon the control signal from the main controller 24.

In addition, the hybrid controller 22 controls the assist generator motor 13, the inverter 19 and the electricity storage device 16 based upon a state of each of the assist generator motor 13 and the inverter 19, and a lever operating amount of the operating device. Further, the main controller 24 outputs a control signal to the regulator 10A of the hydraulic pump 10 to control a delivery amount (power) of the hydraulic pump 10.

Incidentally, in a case where the electricity storage device 16 performs a charge/discharge of a large current, a battery internal resistance thereof temporarily increases, possibly causing temporal performance degradation such as rapid variation in battery voltage. On the other hand, for suppressing the temporal performance degradation of the electricity storage device 16, it is considered to control the output (discharge) of the electricity storage device 16 in response to a state (for example, a square integrated value of a discharge current) of the electricity storage device 16.

In this case, however, when the output of the electricity storage device 16 is limited to suppress the rapid variation in voltage of the electricity storage device 16, there is a possibility that the output corresponding to the limited amount cannot be compensated by an increase in output of the engine 9. In addition, at the time of limiting the output of the electricity storage device 16, there is also a possibility of a failure (for example, a delay) in estimation of an influence on the power of the hydraulic pump 10 or the control of the hydraulic pump 10 based upon this estimation, for example. In such a case, operability of the hydraulic actuators 2E to 15A deteriorates, such as rapid variation in movement of the hydraulic actuators 2E to 15A, and the like possibly giving strange feelings to an operator.

Figure 3:
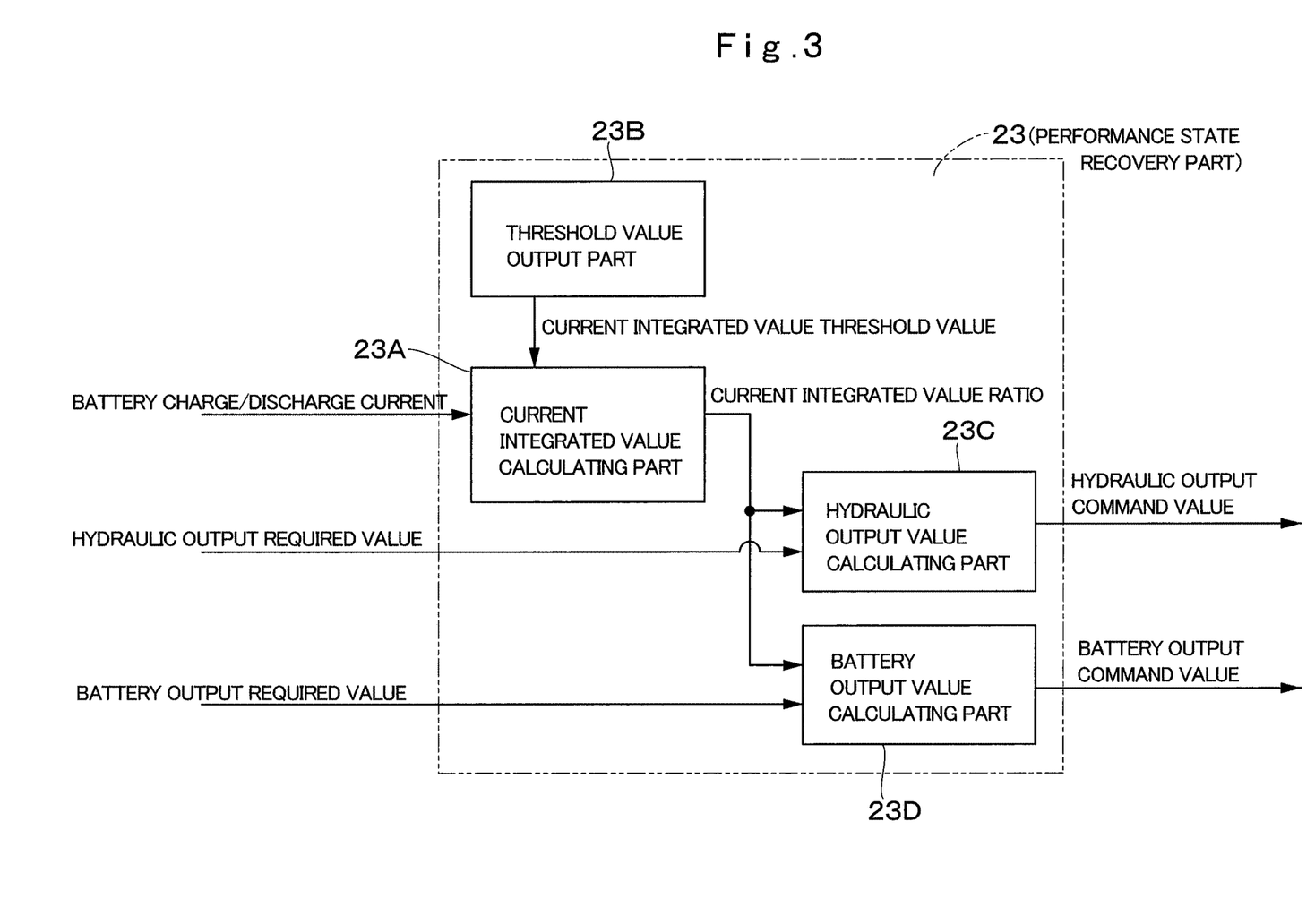
FIG. 3 is a block diagram showing a performance state recovery part according to a first embodiment.
Figure 4:
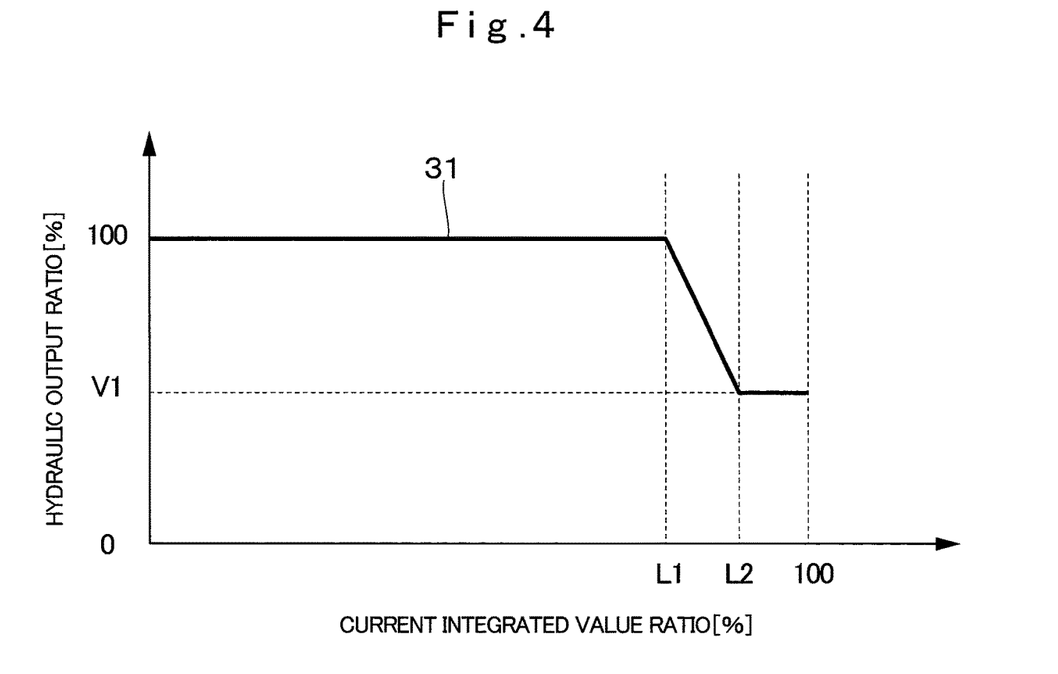
FIG. 4 is a characteristic line diagram showing an example of a relation between a current integrated value ratio and a hydraulic output ratio.
Figure 5:
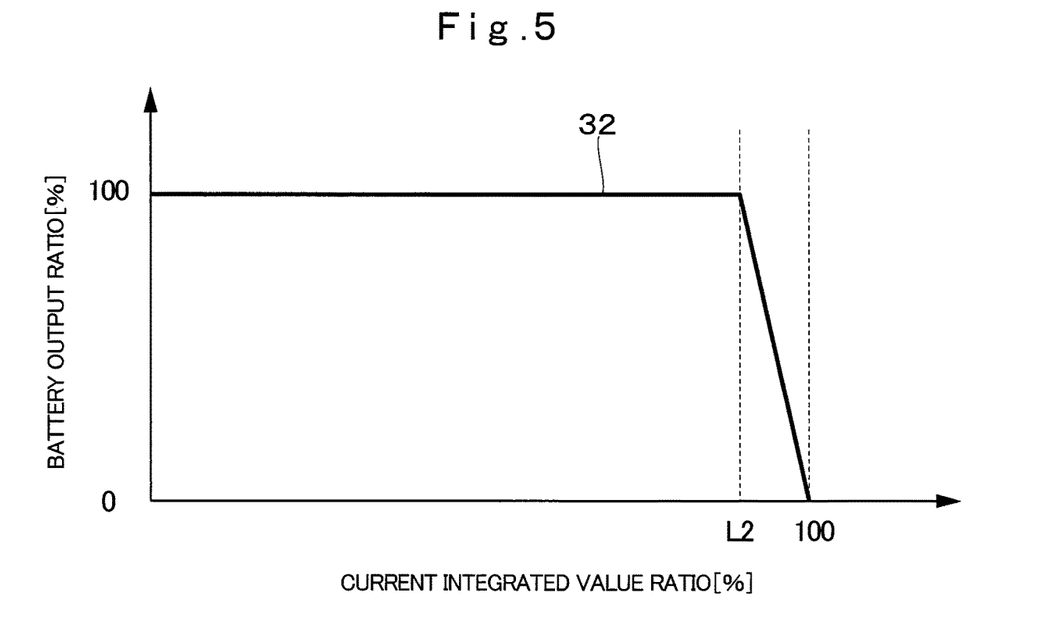
FIG. 5 is a characteristic line diagram showing an example of a relation between a current integrated value ratio and a battery output ratio.

On the other hand, as shown in FIG. 3 to FIG. 5, according to the present embodiment, the hybrid controller 22 limits the power of the hydraulic pump 10 (reduces a delivery amount of the hydraulic pump 10 to be small) in a case where a performance state amount varying with repetition of the discharge and the charge of the electricity storage device 16, specifically, a current integrated value (current integrated value ratio found from current integrated values) based upon the discharge and the charge of the electricity storage device 16 goes beyond a preset, given threshold value (L1%). Thereby, the hybrid controller 22 is provided with a performance state recovery part 23 configured to perform a performance state recovery of the electricity storage device 16.

Here, the performance state recovery part 23 includes a current integrated value calculating part 23A, a threshold value output part 23B, a hydraulic output value calculating part 23C and a battery output value calculating part 23D. The current integrated value calculating part 23A calculates a current integrated value of the electricity storage device 16. Along with this, the current integrated value calculating part 23A compares the calculated current integrated value with a current integrated value threshold value (degradation start value) outputted from the threshold value output part 23B to calculate a current integrated value ratio as that ratio.

Therefore, a battery charge/discharge current of the electricity storage device 16, that is, a current measurement value detected by the current sensor 16C of the electricity storage device 16 is input to the current integrated value calculating part 23A. The current integrated value calculating part 23A calculates a current integrated value as an integrated value of current values in a preset, predetermined time (unit time) from the input current measurement value. The predetermined time is in advance found by experiments, calculations, simulations or the like in such a manner as to be capable of appropriately limiting the power of the hydraulic pump 10 (finally limiting the power of the assist generator motor 13) based upon comparison (ratio) between the current integrated value and the current integrated value threshold value to be described later.

On the other hand, the current integrated value threshold value outputted from the threshold value output part 23B is also input to the current integrated value calculating part 23A. The current integrated value threshold value can be set as a threshold value of a current integrated value in which a temporal increase in internal resistance value does not occur. In other words, the current integrated value threshold value can be set as a degradation start value (degradation start boundary value or degradation start determination value) in which a temporal performance degradation (rapid variation in voltage due to a temporal increase in internal resistance) of the electricity storage device 16 tends to easily occur when the current integrated value threshold value goes beyond that start value.

In the current integrated value calculating part 23A, a current integrated value ratio is calculated as a ratio of the present current integrated value and the current integrated value threshold value therefrom. The current integrated value ratio can be expressed according to the following formula 1. The current integrated value ratio calculated in the current integrated value calculating part 23A is outputted to the hydraulic output value calculating part 23C and the battery output value calculating part 23D.

Current integrated value ratio=(present current integrated value/current integrated value threshold value)×100[%]   [Formula 1]

A current integrated value ratio calculated in the current integrated value calculating part 23A and a hydraulic output required value corresponding to the power to be outputted in the hydraulic pump 10 are input to the hydraulic output value calculating part 23C. Here, the hydraulic output required value can be found from lever input (a lever operating amount of the operating device) of an operator, for example. That is, the hydraulic output required value is a value corresponding to hydraulic power required for realizing the lever input of the operator. In other words, the hydraulic output required value is a value corresponding to power to be outputted in the hydraulic pump 10 for realizing drives of the hydraulic actuators 2E to 15A in response to the lever input of the operator. The hydraulic output required value has a correlation to the lever input of an operator, and for example, as the lever input of the operator is the larger, the hydraulic output required value becomes the larger.

The hydraulic output value calculating part 23C finds a hydraulic output ratio from the current integrated value ratio based upon a relation (characteristic line 31) shown in FIG. 4. Along with it, the hydraulic output value calculating part 23C multiplies the found hydraulic output ratio and the hydraulic output required value to calculate a hydraulic output command value. Here, FIG. 4 shows a relation between a current integrated value ratio and a hydraulic output ratio. As shown in FIG. 4, when the current integrated value ratio is equal to or less than L1%, the hydraulic output ratio becomes 100%.

Therefore, when the current integrated value ratio is equal to or less than L1%, the hydraulic output required value becomes the hydraulic output command value as it is. That is, when the current integrated value ratio is equal to or less than L1%, the hydraulic output required value is not limited.

Therefore, the hydraulic output required value is outputted from the hybrid controller 22 through the main controller 24 to the regulator 10A of the hydraulic pump 10 as a hydraulic output command value as it is. In this case, the power (delivery amount) of the hydraulic pump 10 is not limited. That is, an operator can drive the hydraulic actuators 2E to 15A with the power of the hydraulic pump 10 being not limited.

On the other hand, when the current integrated value ratio goes beyond L1%, the hydraulic output ratio becomes smaller than 100%. Therefore, when the current integrated value ratio goes beyond L1%, the hydraulic output command value is smaller than the hydraulic output required value. That is, when the current integrated value ratio goes beyond L1%, the hydraulic output command value limited to the hydraulic output required value is outputted from the hybrid controller 22 through the main controller 24 to the regulator 10A of the hydraulic pump 10 to limit a delivery amount of the hydraulic pump 10 (reduce it to be small).

Thereby, as compared to when the power of the hydraulic pump 10 is limited and the hydraulic output ratio is 100%, the drives of the hydraulic actuators 2E to 15A are more limited. At this time, an extra power amount generated due to the limit of the power of the hydraulic pump 10 can be allotted to an output reducing amount of the assist generator motor 13. As a result, the current of the charge/discharge of the electricity storage device 16 can be reduced to perform the performance state recovery of the electricity storage device 16.

Here, when the current integrated value ratio goes beyond L1%, the hydraulic output ratio linearly lowers from 100% to V1% such that the hydraulic output ratio becomes V1% when the current integrated value ratio is L2%. Thereby, the power of the hydraulic pump 10 is linearly limited in a range of L1% to L2% of the current integrated value ratio. In this case, the hydraulic output ratio V1% can be expressed according to the following formula 2 in a case where a hydraulic value (a minimum hydraulic value of being capable of securing the operability) allowing a reduction in operability of the hydraulic excavator 1 is defined as an operability allowing hydraulic value and a hydraulic value (a maximum hydraulic value) as an upper limit of hydraulic output is defined as a hydraulic output upper limit value. It should be noted that the operability allowing hydraulic value is in advance found as a hydraulic value allowing a reduction in operability of the hydraulic excavator 1 by experiments, calculations, simulations and the like.

$$V1=\text{(operability allowing hydraulic value/hydraulic output upper limit value)} \times 100[\%] \qquad \text{[Formula 2]}$$

Further, when the current integrated value ratio is equal to or more than L2%, the hydraulic output ratio is fixed to V1%. That is, in the embodiment, the hydraulic output ratio is not lower than V1% in a range of 0% to 100% of the current integrated value ratio. Therefore, absolutely in a range of 0% to L10% and in a range of L1% to L2% of the current integrated value ratio and also in a range of L2% to 100% of the current integrated value ratio, the hydraulic output ratio is equal to or more than V1%, making it possible to secure the operability of the hydraulic excavator 1.

On the other hand, when the current integrated value ratio goes beyond L2%, the battery output value calculating part 23D performs output limit of the assist generator motor 13 for protection of the electricity storage device 16. That is, a current integrated value ratio calculated in the current integrated value calculating part 23A and a battery output required value corresponding to the power to be outputted in the assist generator motor 13 are input to the battery output value calculating part 23D. Here, the battery output required value can be found from lever input (a lever operating amount of the operating device) of an operator, available input/output power of the electricity storage device 16, a rotational speed of the engine 9, and the like, for example. In this case, the available input/output power of the electricity storage device 16 can be calculated in accordance with a state of the electricity storage device 16 at that time, such as a voltage, an internal resistance, a temperature or the like of the lithium ion secondary battery 16A.

The battery output value calculating part 23D finds a battery output ratio from the current integrated value ratio based upon a relation (characteristic line 32) shown in FIG. 5. Along with it, the battery output value calculating part 23D multiplies the found battery output ratio and the battery output required value to calculate a battery output command value. Here, FIG. 5 shows a relation between a current integrated value ratio and a battery output ratio. As shown in FIG. 5, when the current integrated value ratio is equal to or less than L2%, the battery output ratio becomes 100%.

Therefore, when the current integrated value ratio is equal to or less than L2%, the battery output required value becomes the battery output command value as it is. That is, when the current integrated value ratio is equal to or less than L2%, the battery output required value is not limited, and the battery output required value is outputted from the hybrid controller 22 to the control part 19A of the inverter 19 as a battery output command value as it is. In this case, the power of the assist generator motor 13 is not limited, and the assist generator motor 13 can assist in a drive of the engine 9 or can perform power generation.

On the other hand, when the current integrated value ratio goes beyond L2%, the battery output ratio becomes smaller than 100%. Therefore, when the current integrated value ratio goes beyond L2%, the battery output command value is smaller than the battery output required value. That is, when the current integrated value ratio goes beyond L2%, the battery output command value limited to the battery output required value is outputted from the hybrid controller 22 to the inverter 19.

In this case, the power of the assist generator motor 13 is limited, and the assist or the power generation by the assist generator motor 13 is limited. As a result, the current of the charge/discharge of the electricity storage device 16 can be reduced to perform the performance state recovery of the electricity storage device 16. Here, when the current integrated value ratio goes beyond L2%, the battery output ratio linearly lowers from 100% such that the battery output ratio becomes 0% when the current integrated value ratio is 100%. Thereby, the power of the assist generator motor 13 is linearly limited in a range of L2% to 100% of the current integrated value ratio. Further, when the current integrated value ratio is equal or to more than 100%, the battery output ratio becomes 0%, and the hybrid controller 22 stops the discharge and the charge of the electricity storage device 16.

Thus, in the embodiment, the performance state recovery part 23 limits the power of the hydraulic pump 10 in a case where the current integrated value of the electricity storage device 16, more specifically, the current integrated value ratio goes beyond L1% as a predetermined threshold value (first threshold value). Thereby, the performance state recovery part 23 performs the performance state recovery of the electricity storage device 16 (hydraulic pump power limiting element).

It should be noted that in a case where the current integrated value ratio is not lowered even when the performance state recovery part 23 limits the power of the hydraulic pump 10, the performance state recovery part 23 limits the power of the assist generator motor 13 as well. That is, for example, in case where the current integrated value ratio further increases and goes beyond L2% as a predetermined threshold value (second threshold value) (in a case where the current integrated value ratio is not lower than L2%) even when the power of the hydraulic pump 10 is limited, the performance state recovery part 23 limits the power of the assist generator motor 13 as well. In this case, the performance state recovery part 23 performs the performance state recovery of the electricity storage device 16 not only by limiting the power of the hydraulic pump 10 but also by limiting the power of the assist generator motor 13 (electric motor power limiting element).

Further, in a case where the current integrated value ratio is not lowered even when the performance state recovery part 23 limits the power of the hydraulic pump 10 and the power of the assist generator motor 13, the performance state recovery part 23 stops the discharge and charge of the electricity storage device 16. That is, for example, in case where the current integrated value ratio further increases from L2% to reach 100% as a predetermined threshold value (third threshold value) or more (in a case of being not lowered less than 100%) even when the performance state recovery part 23 limits the power of the hydraulic pump 10 and the power of the assist generator motor 13, the performance state recovery part 23 stops the discharge and charge of the electricity storage device 16. Thereby, the performance state recovery part 23 performs the performance state recovery of the electricity storage device 16 (electric motor stopping element).

In this way, the performance state recovery part 23 has the hydraulic pump power limiting element, the electric motor power limiting element and the electric motor stopping element. Thereby, both the suppression of the temporal performance degradation (rapid variation in voltage due to a temporal increase in internal resistance) of the electricity storage device 16 and the improvement on operation feelings at the time of limiting use of the electricity storage device 16 can be achieved.

It should be noted that the current integrated value ratios L1, L2 and the hydraulic output ratio V1 can have various values depending upon differences in specification, control specification and the like of the mount equipment devices such as the hydraulic pump 10, the hydraulic cylinders 5D, 5E, 5F, the hydraulic motors 2E, 2F, 15A, the electricity storage device 16, the assist generator motor 13, the engine 9 and the like. In addition, a way of performing the output limit of the hydraulic output value calculating part 23C (a relation between a current integrated value ratio and a hydraulic output ratio in FIG. 4) and a way of performing the output limit of the battery output value calculating part 23D (a relation between a current integrated value ratio and a battery output ratio in FIG. 5) also can have various methods depending upon differences in specification and control specification of the mount equipment device, and the like.

In this way, the current integrated value ratios L1, L2, the hydraulic output ratio V1, the relation between the current integrated value ratio and the hydraulic output ratio (characteristic line 31), the relation between the current integrated value ratio and the battery output ratio (characteristic line 32) can be set in response to a model of the hydraulic excavator or the like to be capable of achieving both the suppression of the temporal performance degradation of the electricity storage device 16 and the suppression of degradation in operability of the hydraulic actuators 2E to 15A (improvement on operation feelings at the time of limiting use of the electricity storage device 16).

The hybrid type hydraulic excavator 1 according to the present embodiment has the configuration as described above, and next, an explanation will be made of an operation thereof.

When an operator having got in the cab 7 activates the engine 9, the hydraulic pump 10 and the assist generator motor 13 are driven by the engine 9. Thereby, the hydraulic oil delivered from the hydraulic pump 10 delivers toward the left and right traveling hydraulic motors 2E, 2F, the revolving hydraulic motor 15A, and the boom cylinder 5D, the arm cylinder 5E and the bucket cylinder 5F of the working mechanism 5 in response to the lever operation of the operating device provided in the cab 7. Thereby, the hydraulic excavator 1 can perform the traveling movement by the lower traveling structure 2, the revolving movement of the upper revolving structure 4, the excavating work by the working mechanism 5, and the like.

Here, when the output torque of the engine 9 is larger than drive torque of the hydraulic pump 10 at the operating time of the hydraulic excavator 1, the assist generator motor 13 is driven as an electric generator by extra torque. Thereby, the assist generator motor 13 generates AC power, and the AC power is converted into DC power by the inverter 19 to be stored in the electricity storage device 16. On the other hand, when the output torque of the engine 9 is smaller than the drive torque of the hydraulic pump 10, the assist generator motor 13 is driven as an electric motor by power from electricity storage device 16, which assists in the drive of the engine 9.

Further, when the charge/discharge of the electricity storage device 16 to the assist generator motor 13 has a tendency of becoming a large current, a current integrated value calculated in the current integrated value calculating part 23A, finally, the current integrated value ratio becomes large in the performance state recovery part 23 of the hybrid controller 22. As a result, the limit of the power of the hydraulic pump 10 is performed based upon the characteristic line 31 in FIG. 4 in the hydraulic output value calculating part 23C of the performance state recovery part 23. Further, the limit of the power of the assist generator motor 13 is performed based upon the characteristic line 32 in FIG. 5 in the battery output value calculating part 23D of the performance state recovery part 23.

In this way, according to the embodiment, it is possible to achiever both the suppression of the temporal performance degradation of the electricity storage device 16 and the improvement on operation feelings at the time of limiting use of the electricity storage device 16.

That is, according to the embodiment, the performance state recovery part 23 in the hybrid controller 22 limits the power of the hydraulic pump 10 in a case where a performance state amount (a current integrated value and a current integrated value ratio) of the electricity storage device 16 goes beyond a predetermined threshold value. Here, a performance state amount (current integrated value ratio: 100%) where a temporal performance degradation (rapid variation in voltage to a temporal increase in internal resistance) of the electricity storage device 16 tends to easily occur is defined as a degradation start value (a degradation start boundary value or degradation start determination value). In this case, the first threshold value as the predetermined threshold value, that is, a power limit start value of starting the limit of the power of the hydraulic pump 10 can be set as a smaller value (current integrated value ratio: L1%) than the degradation start value, for example.

On the other hand, when the performance state recovery part 23 limits the power of the hydraulic pump 10, the load of the electricity storage device 16 is lowered, making it possible to perform the performance state recovery of the electricity storage device 16. That is, limiting the power of the hydraulic pump 10 enables the current of the charge/discharge of the electricity storage device 16 to be lowered. Therefore, an increase in the performance state amount (a current integrate value and a current integrated value ratio) of the electricity storage device 16 can be suppressed to suppress the performance state amount from being closer to the degradation start value (degradation start determination value: 100%). This can suppress the temporal performance degradation (rapid variation in voltage due to a temporal increase in internal resistance) of the electricity storage device 16.

Further, the limit of the power of the hydraulic pump 10 can set the degradation in operability of the hydraulic actuators 2E to 15A in an allowable range (100%≥hydraulic output ratio≥V1%). Therefore, at the time of performing the performance state recovery of the electricity storage device 16 by limiting the power of the hydraulic pump 10, it is possible to suppress degradation in operability of the hydraulic actuators 2E to 15A, finally, the rapid variation in movement of the hydraulic actuators 2E to 15A. As a result, it is possible to achieve both the suppression of the temporal performance degradation of the electricity storage device 16 and the improvement on operation feelings at the time of limiting use of the electricity storage device 16.

According to the embodiment, even when the performance state recovery part 23 limits the power of the hydraulic pump 10, in a case where the performance state amount (the current integrated value and the current integrated value ratio) of the electricity storage device 16 is not lower than the predetermined threshold value (the current integrated value ratio: L1%) and further, goes beyond the second threshold value as the predetermined threshold value, that is, the electric motor power limit start value (the current integrated ratio: L2%), the performance state recovery part 23 limits the power of the assist generator motor 13 as the electric motor. That is, in this case, the performance state recovery part 23 performs the performance state recovery of the electricity storage device 16 by limiting the power of the assist generator motor 13 as the electric motor together with limiting the power of the hydraulic pump 10. Therefore, it is possible to further lower the load of the electricity storage device 16 by limiting both the power of the hydraulic pump 10 and the power of the assist generator motor 13. This can lower the performance state amount of the electricity storage device 16 and suppress the performance degradation of the electricity storage device 16.

According to the embodiment, even when the performance state recovery part 23 limits the power of the hydraulic pump 10 and limits the power of the assist generator motor 13, in a case where the performance state amount (the current integrated value and the current integrated value ratio) of the electricity storage device 16 is not lower than the predetermined threshold value (the current integrated value ratio: L1%) and further, reaches the third threshold value as the predetermined threshold value (the current integrated value ratio: 100%=degradation start value), the performance state recovery part 23 stops the discharge and the charge of the electricity storage device 16. In this way, the performance state recovery part 23 performs the performance state recovery of the electricity storage device 16. Therefore, the performance state recovery part 23 can directly lower the performance state amount of the electricity storage device 16 and suppress the performance degradation of the electricity storage device 16.

According to the embodiment, the performance state amount of the electricity storage device 16 is defined by the current integrated value (current integrated value ratio) based upon the discharge and the charge of the electricity storage device 16. Accordingly, the predetermined threshold value (the first threshold value: L1%, the second threshold value: L2%, and the third threshold value: 100%) of limiting the power of the hydraulic pump 10 can be set as the current integrated value (current integrated value ratio). Here, the increase of the current integrated value (current integrated value ratio) has a correlation to the increase in current of the discharge/charge of the electricity storage device 16. Therefore, the power of the hydraulic pump 10 can be limited at appropriate timing based upon the current integrated value.

Figure 6:
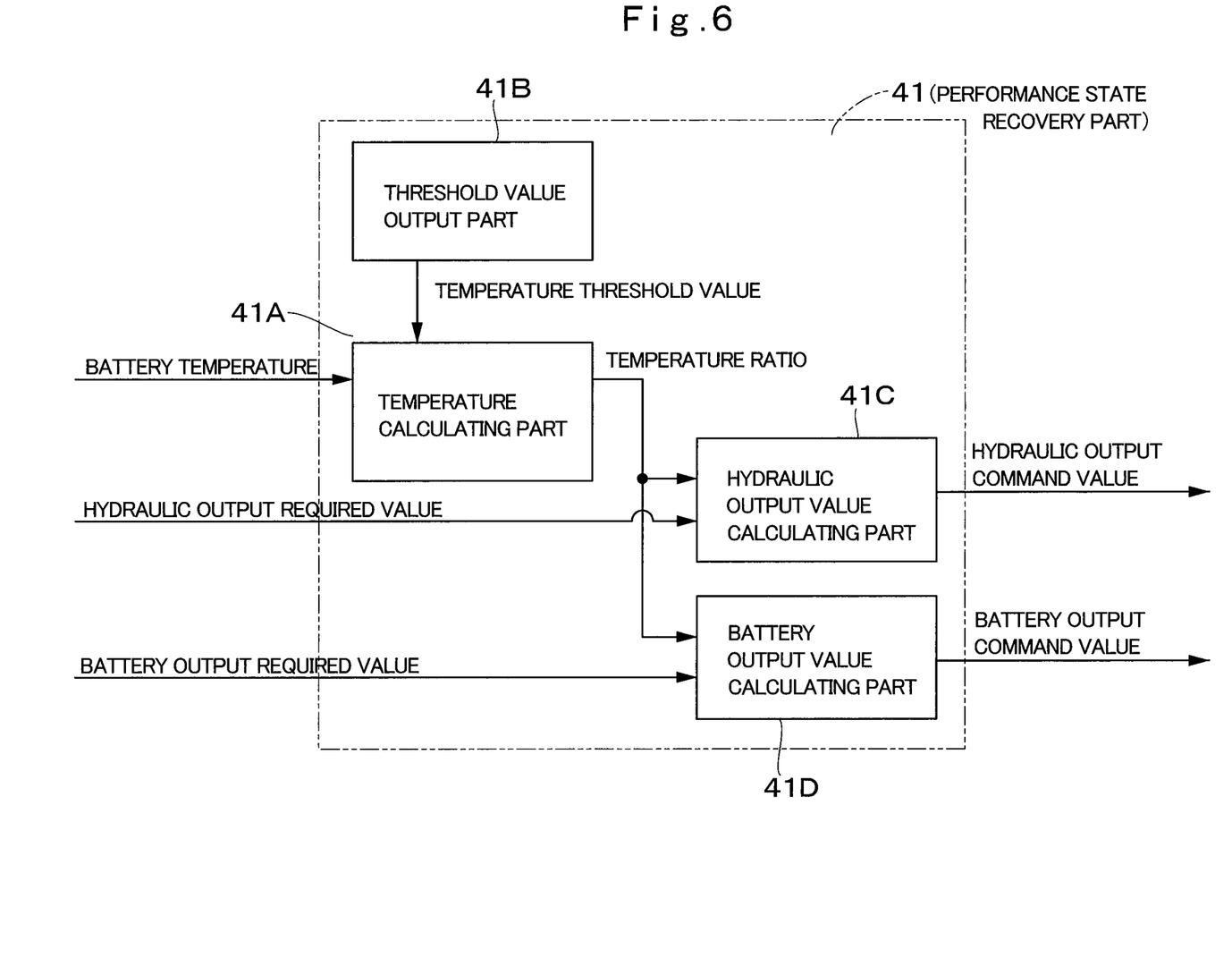
FIG. 6 is a block diagram showing a performance state recovery part according to a second embodiment.
Figure 8:
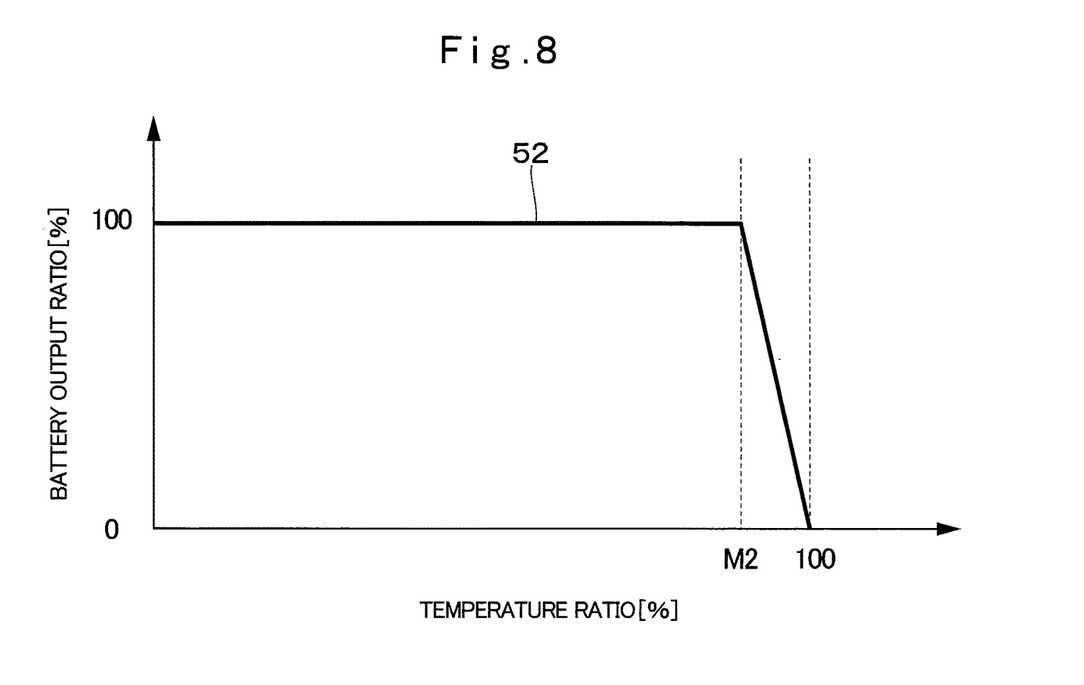
FIG. 8 is a characteristic line diagram showing an example of a relation between a temperature ratio and a battery output ratio.

Next, FIG. 6 and FIG. 8 show a second embodiment of the present invention. The second embodiment is characterized in that a performance state amount changing with repetition of a discharge and a charge by an electricity storage device is indicated at a temperature of the electricity storage device itself. It should be noted that in the second embodiment, components identical to those in the aforementioned first embodiment will be referred as identical reference numerals to omit an explanation thereof.

A performance state recovery part 41 is used in the second embodiment instead of the performance state recovery part 23 in the first embodiment. In a case where a performance state amount changing with repetition of a discharge and a charge by the electricity storage device 16, specifically, a temperature of the electricity storage device 16 itself (a temperature ratio therefrom) goes beyond a preset predetermined threshold value (M1%), the performance state recovery part 41 limits the power of the hydraulic pump 10. Thereby, the performance state recovery part 41 can perform the performance state recovery of the electricity storage device 16.

That is, the lithium ion secondary battery 16A forming the electricity storage device 16 needs to suppress performance degradation due to change in quality of electrolytic solution or performance degradation of a short circuit and the like due to damages of a separator electrically separating a positive pole from a negative pole. Therefore, the lithium ion secondary battery 16A needs to be managed in such a manner that a temperature thereof is not equal to or more than 60° C., for example. Therefore, in the second embodiment, the temperature of the electricity storage device 16 itself, that is, the temperature of the lithium ion secondary battery 16A is detected by the temperature sensor 16E (refer to FIG. 2). In addition, the performance state recovery part 41 limits the power of the hydraulic pump 10 (further, limits the power of the assist generator motor 13) based upon the temperature detected by the temperature sensor 16E (the temperature ratio found therefrom). Thereby, the performance state recovery part 41 can perform the performance state recovery of the electricity storage device 16.

Here, the performance state recovery part 41 includes a temperature calculating part 41A, a threshold value output part 41B, a hydraulic output value calculating part 41C and a battery output value calculating part 41D. The temperature calculating part 41A compares a temperature of the electricity storage device 16 itself (a temperature of the lithium ion secondary battery 16A) with a temperature threshold value (degradation start value) outputted from the threshold value output part 41B to calculate a temperature ratio as that ratio.

Therefore, the temperature detected by the temperature sensor 16E is input to the temperature calculating part 41A. In addition, the temperature threshold value outputted from the threshold value output part 41B is also input to the temperature calculating part 41A. The temperature threshold value can be set as a threshold value of a temperature (for example, 60° C.) in which performance degradation of the lithium ion secondary battery 16A does not occur. In other words, the temperature threshold value can be set as a degradation start value (degradation start boundary value and degradation start determination value) in which the performance degradation of the lithium ion secondary battery 16A tends to easily occur when the temperature threshold value goes beyond that start value.

In the temperature calculating part 41A, a temperature ratio is calculated as a ratio of the present temperature and the temperature threshold value therefrom. The temperature ratio can be expressed according to the following formula 3. The temperature ratio calculated in the temperature calculating part 41A is outputted to a hydraulic output value calculating part 41C and a battery output value calculating part 41D.

Temperature ratio=(present temperature/temperature threshold value)×100[%]  [Formula 3]

Figure 7:
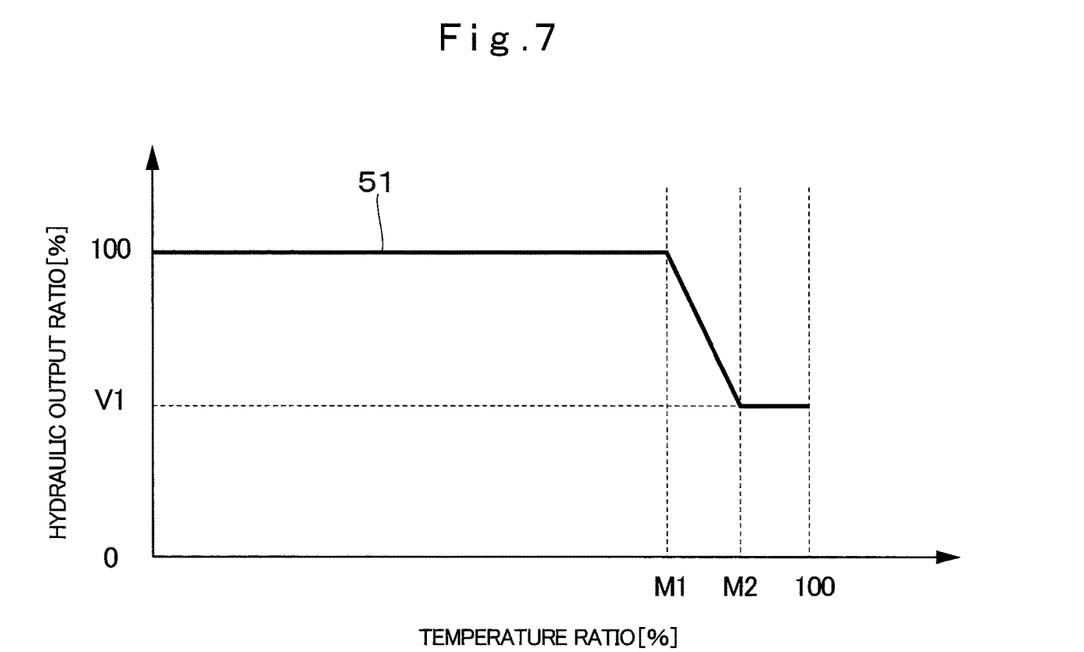
FIG. 7 is a characteristic line diagram showing an example of a relation between a temperature ratio and a hydraulic output ratio.

A temperature ratio calculated in the temperature calculating part 41A and a hydraulic output required value corresponding to the power to be outputted in the hydraulic pump 10 are input to the hydraulic output value calculating part 41C. The hydraulic output value calculating part 41C finds a hydraulic output ratio from the temperature ratio based upon a relation (characteristic line 51) shown in FIG. 7. Along with it, the hydraulic output value calculating part 41C multiplies the found hydraulic output ratio and the hydraulic output required value to calculate a hydraulic output command value. Here, FIG. 7 shows a relation between a temperature ratio and a hydraulic output ratio. As shown in FIG. 7, when the temperature ratio is equal to or less than M1%, the hydraulic output ratio becomes 100%, and when the temperature ratio goes beyond M1%, the hydraulic output ratio becomes smaller than 100%.

In this case, the temperature ratio M1% can be set to a value corresponding to, for example, 40° C. (=40° C./60° C.≅67%). In addition, when the temperature ratio goes beyond M1%, the hydraulic output ratio becomes V1% when the temperature ratio is M2%. The hydraulic output ratio V1% can be expressed according to the aforementioned formula 2. Further, the temperature ratio M2% can be set to a value corresponding to, for example, 50° C. (=50° C./60° C.≅83%).

On the other hand, when the temperature ratio goes beyond M2%, the battery output value calculating part 41D performs output limit of the assist generator motor 13 for protection of the electricity storage device 16. That is, a temperature ratio calculated in the temperature calculating part 41A and a hydraulic output required value corresponding to the power to be outputted in the assist generator motor 13 are input to the battery output value calculating part 41D. The battery output value calculating part 41D finds a battery output ratio from the temperature ratio based upon a relation (characteristic line 52) shown in FIG. 8. Along with it, the battery output value calculating part 41D multiplies the found battery output ratio and the battery output required value to calculate a battery output command value.

Here, FIG. 8 shows a relation between a temperature ratio and a battery output ratio. As shown in FIG. 8, when the temperature ratio is equal to or less than M2%, the battery output ratio becomes 100%, and when the temperature ratio goes beyond M2%, the hydraulic output ratio becomes smaller than 100%. In addition, when the temperature ratio is equal to or more than 100%, the battery output ratio becomes 0%, and the hybrid controller 22 stops the discharge and the charge of the electricity storage device 16.

Thus, in the embodiment, the performance state recovery part 41 performs the performance state recovery of the electricity storage device 16 by limiting the power of the hydraulic pump 10 in a case where the temperature ratio (temperature) of the electricity storage device 16 goes beyond M1% (40° C.) as a predetermined threshold value (first threshold value) (hydraulic pump power limiting element).

In addition, in a case where the temperature ratio (temperature) is not lowered even when the power of the hydraulic pump 10 is limited, the performance state recovery part 41 limits the power of the assist generator motor 13 as well. That is, for example, in case where the temperature ratio (temperature) further increases and goes beyond M2% (50° C.) as a predetermined threshold value (second threshold value) (in a case of being not lower than the second threshold value) even when the power of the hydraulic pump 10 is limited, the performance state recovery part 41 limits the power of the assist generator motor 13 as well. In this case, the performance state recovery part 41 performs the performance state recovery of the electricity storage device 16 not only by limiting the power of the hydraulic pump 10 but also by limiting the power of the assist generator motor 13 (electric motor power limiting element).

Further, in a case where the temperature ratio (temperature) of the electricity storage device 16 is not lowered even when the power of the hydraulic pump 10 is limited and the power of the assist generator motor 13 is limited, the performance state recovery part 41 stops the discharge and charge of the electricity storage device 16. That is, for example, in case where the temperature ratio (temperature) further increases from M2% (50° C.) to reach 100% (60° C.) as a predetermined threshold value (third threshold value) (in a case of being not lower than the third threshold value), the performance state recovery part 41 stops the discharge and charge of the electricity storage device 16. Thereby, the performance state recovery part 41 performs the performance state recovery of the electricity storage device 16 (electric motor stopping element).

In this way, the performance state recovery part 41 has the hydraulic pump power limiting element, the electric motor power limiting element and the electric motor stopping element. Thereby, both the suppression of the performance degradation of the electricity storage device 16 and the improvement on operation feelings at the time of limiting use of the electricity storage device 16 can be achieved.

The second embodiment limits the power of the hydraulic pump 10, limits the power of the assist generator motor 13, and stops the discharge/charge of the electricity storage device 16, based upon the temperature (temperature ratio) of the electricity storage device 16 as described above, and a basic operation thereof is particularly not different from that according to the aforementioned first embodiment.

Particularly, according to the second embodiment, the performance state amount of the electricity storage device 16 is indicated at the temperature (temperature ratio) of the electricity storage device 16 itself. Accordingly, the predetermined threshold value (the first threshold value: M1%, the second threshold value: M2%, and the third threshold value: 100%) of limiting the power of the hydraulic pump 10 can be set as the temperature (temperature ratio) of the electricity storage device 16 itself. Here, an increase in temperature of the electricity storage device 16 itself has a correlation to progress of performance degradation of the electricity storage device 16. Therefore, it is possible to limit the power of the hydraulic pump 10 at appropriate timing based upon the temperature of the electricity storage device 16 itself.

It should be noted that the aforementioned first embodiment is explained by taking a case where the hybrid controller 22 is equipped with the performance state recovery part 23, as an example. However, the present invention is not limited thereto, but, for example, the control part 16B in the electricity storage device 16 may be configured to be equipped with a performance state recovery part. In addition, for example, the ECU 9A as the control part of the engine 9A or the control part 19A of the inverter 19 may be configured to be equipped with a performance state recovery part. Further, the main controller 24 to which the hybrid controller 22 and the ECU 9A are connected may be configured to be equipped with a performance state recovery part. This arrangement can be likewise applied to the second embodiment.

The aforementioned first embodiment is explained by taking a case where the current integrated value ratio as the ratio of the current integrated value and the current integrated value threshold value (degradation start value) is calculated, and according to the calculated value of the current integrated value ratio, the power of the hydraulic pump 10 is limited, the power of the assist generator motor 13 is limited and the electricity storage device 16 is stopped (the charge and discharge are stopped), as an example. However, the present invention is not limited thereto, but, for example, without calculating the current integrated value ratio, the power of the hydraulic pump 10 may be limited, the power of the assist generator motor 13 may be limited and the electricity storage device 16 may be stopped according to the current integrated value, respectively.

The aforementioned second embodiment is explained by taking a case where the temperature ratio as the ratio of the temperature and the temperature threshold value (degradation start value) is calculated, and according to the calculated value of the temperature ratio, the power of the hydraulic pump 10 is limited, the power of the assist generator motor 13 is limited and the electricity storage device 16 is stopped (the charge and discharge are stopped), as an example. However, the present invention is not limited thereto, but, for example, without calculating the temperature ratio, the power of the hydraulic pump 10 may be limited, the power of the assist generator motor 13 may be limited and the electricity storage device 16 may be stopped in accordance with the temperature.

The aforementioned first embodiment is explained by taking a case where the hydraulic output command value is outputted to the regulator 10A of the hydraulic pump 10 from the performance state recovery part 23, as an example. That is, the first embodiment is explained by taking a case where the hydraulic output command value smaller than the hydraulic output required value is outputted to the regulator 10A of the hydraulic pump 10 from the performance state recovery part 23 to limit the power of the hydraulic pump 10, as an example.

However, the present invention is not limited thereto, but, for example, the hydraulic output command value may be outputted to the control valve 12 from the performance state recovery part 23. Here, the control valve 12 is, for example, formed as a control valve that switches delivery/suction of the hydraulic oil from/to the hydraulic actuators 2E to 15A in response to pilot signals (pilot pressures) from the traveling operating lever/pedal device and the working operating lever device, which are operated by an operator. In this case, when the hydraulic output command value smaller than the hydraulic output required value is outputted to the control valve 12 from the performance state recovery part, the control valve 12 limits, for example, a pilot signal (pilot pressure) based upon an operation of an operator, making it possible to limit the hydraulic oil to be delivered to the hydraulic actuators 2E to 15A. That is, the power of the hydraulic pump 10 may be indirectly limited by outputting the hydraulic output command value to the control valve 12 from the performance state recovery part 23 and limiting the hydraulic oil to be delivered to the hydraulic actuators 2E to 15A by the control valve 12. This arrangement can be likewise applied to the second embodiment.

The aforementioned first embodiment is explained by taking a case where the drive source of the revolving device 15 is formed of the revolving hydraulic motor 15A, as an example. However, the present invention is not limited thereto, but, for example, the drive source of the revolving device 15 may be formed by a combination of a hydraulic motor (a revolving hydraulic motor) and an electric motor (revolving electric motor). In addition, the drive source of the revolving device 15 may be formed only by an electric motor (revolving electric motor). This arrangement can be likewise applied to the second embodiment.

Each of the aforementioned embodiments is explained by taking a case of adopting the hybrid type hydraulic excavator 1 as the construction machine, as an example. However, the present invention is not limited thereto, but the present invention may be applied widely to various types of hybrid type construction machines having the electric motor and the engine connected to the electricity storage device as the power source of the hydraulic pump, such as a hybrid type wheel loader or a hybrid type dump truck (transporting vehicle), for example. Further, the present invention is applicable to electric construction machines that drive a hydraulic pump by an electric motor alone without an engine. In addition, each of the embodiments is described as only an example, and without mentioning, a partial replacement or a partial combination of components described in the different embodiments is made possible.

DESCRIPTION OF REFERENCE NUMERALS

1: Hydraulic excavator (Construction machine)
2E, 2F: Traveling hydraulic motor (Hydraulic actuator)
5D: Boom cylinder (Working hydraulic cylinder, hydraulic actuator)
5E: Arm cylinder (Working hydraulic cylinder, hydraulic actuator)
5F: Bucket cylinder (Working hydraulic cylinder, hydraulic actuator)
9: Engine
10: Hydraulic pump

13: Assist generator motor (Electric motor)
15A: Revolving hydraulic motor (Hydraulic actuator)
16: Electricity storage device
22: Hybrid controller (Controller)
23, 41: Performance state recovery part

The invention claimed is:

1. A construction machine comprising:
an electric motor;
a hydraulic pump to be driven by said electric pump;
a hydraulic actuator to be driven by hydraulic oil delivered from said hydraulic pump;
a battery that supplies power to said electric motor or is charged with generated power by said electric motor; and
a controller configured to control at least one of said electric motor, said hydraulic pump and said battery and perform performance state recovery of said battery for suppressing the temporal performance degradation in internal resistance of said battery by lowering the load of said battery, characterized in that:
said controller is, in a case where one of the value of a current integrate value, a current integrated value ratio, a temperature, and a temperature ratio of said battery which is a performance state amount that varies with repetition of the discharge and charge of said battery goes beyond a first threshold value, configured to perform said performance state recovery of said battery by limiting power of said hydraulic pump without limiting power of said electric motor, and
said controller is, in a case where said performance state amount goes beyond a second threshold value which is larger than said first threshold value, configured to perform the performance state recovery of said battery not only by limiting the power of said hydraulic pump but also by limiting the power of said electric motor.

2. The construction machine according to claim 1, wherein
said controller is configured to, in a case where said performance state amount reached a third threshold value which is larger than said second threshold value even when the power of said hydraulic pump is limited and the power of said electric motor is limited, perform the performance state recovery of said battery by stopping the discharge and charge of said battery.

3. The construction machine according to claim 1, further comprising:
an engine mechanically connected to said electric motor, wherein said hydraulic pump is driven by said electric motor and said engine.

* * * * *